United States Patent
Kilmartin et al.

(10) Patent No.: US 7,127,797 B1
(45) Date of Patent: Oct. 31, 2006

(54) IMPARTING COMPRESSIVE HOOP STRESS INTO A BONDED MAGNETOELASTIC ELEMENT BY MEANS OF DIAMETER REDUCTION OF THE UNDERLYING SHAFT

(76) Inventors: Brian D. Kilmartin, 1082 Avon Blvd., Chesire, CT (US) 06410; Carl Gandarillas, 302 Bethany Rd., Beacon Falls, CT (US) 06403; Jon W. Bossoli, 43 Guinevere Ridge, Cheshire, CT (US) 06410

( * ) Notice: Subject to any disclaimer, the term of this patent is extended or adjusted under 35 U.S.C. 154(b) by 0 days.

(21) Appl. No.: 09/553,647

(22) Filed: Apr. 20, 2000

(51) Int. Cl.
  *H01F 7/06* (2006.01)
(52) U.S. Cl. .............................. 29/602.1; 73/862.336
(58) Field of Classification Search ............ 29/602.01, 29/607, 623.1; 73/862.333, 862.334, 779, 73/862.336; 324/253, 225, 623.1, 209
See application file for complete search history.

(56) References Cited

U.S. PATENT DOCUMENTS

| | | | |
|---|---|---|---|
| 4,760,745 A | 8/1988 | Garshelis | |
| 4,896,544 A | 1/1990 | Garshelis | |
| 4,899,598 A * | 2/1990 | Gumaste et al. ......... | 73/862.36 |
| 5,351,555 A | 10/1994 | Garshelis | |
| 5,386,733 A | 2/1995 | Hesthamar et al. | |
| 5,465,627 A | 11/1995 | Garshelis | |
| 5,520,059 A | 5/1996 | Garshelis | |
| 5,591,925 A | 1/1997 | Garshelis | |
| 5,706,572 A * | 1/1998 | Garshelis ................... | 29/602.1 |
| 5,708,216 A | 1/1998 | Garshelis | |
| 5,889,215 A * | 3/1999 | Kilmartin et al. ...... | 73/862.335 |
| 5,907,105 A * | 5/1999 | Pinkerton et al. ...... | 73/862.336 |
| 6,145,387 A | 11/2000 | Garshelis | |
| 6,222,363 B1 * | 4/2001 | Cripe .......................... | 324/253 |
| 6,301,976 B1 * | 10/2001 | Bogdanov .............. | 73/862.333 |
| 6,330,833 B1 * | 12/2001 | Opie et al. ............. | 73/862.333 |
| 6,516,508 B1 * | 2/2003 | Gandarillas ................ | 29/602.1 |

FOREIGN PATENT DOCUMENTS

EP     0525551     3/1993

OTHER PUBLICATIONS

Copending U.S. Appl. No. 09/437,932, filed Nov. 10, 1999.

* cited by examiner

*Primary Examiner*—Minh Trinh

(57) ABSTRACT

A method for producing a low-hysteresis magnetoelastic element comprising applying a magnetoelastic material onto a metal substrate. After the magnetoelastic element is securely bonded to the underlying shaft, a reduction in the outside diameter of the shaft draws the magnetoelastic element radially inward causing it to occupy a smaller volume. This process provides the magnetic anistropy required for the sensor to operate properly, and also results in a densification of the magnetoelastic element making it inherently stable. Several methods of reducing the outside diameter of the shaft to draw the magnetoelastic element radially inward have been devised. Prior to deposition of the magnetoelastic material, the outside diameter of a hollow shaft is elastically expanded by applying force to its inside diameter. This is accomplished by using an expanding insert, by pressurizing the cavity within the shaft, or by inducing a managed thermal expansion of the shaft prior to material deposition. Post-deposition operation can also be implemented to reduce the shaft diameter, such as drawing the shaft axially until it yields. Any process that results in a shaft reduction after the magnetoelastic active material is deposited on the shaft can be used in the present invention.

16 Claims, 1 Drawing Sheet

IMPARTING COMPRESSIVE HOOP STRESS INTO A BONDED MAGNETOELASTIC ELEMENT BY MEANS OF DIAMETER REDUCTION OF THE UNDERLYING SHAFT

BACKGROUND

1. Field of the Invention

This invention relates generally to torque sensors, and in particular to non-compliant torque sensors utilizing a magnetoelastic element and a non-contacting magnetometer for sensing magnetic field changes that correspond to changing torque values in a rotatable shaft.

2. Related Art

Sensing the torque of rotating shafts is desirable in many applications, such as determining steering wheel effort measurements in electronic power steering systems, determining transmission output torque for electronically controlled shifting, determining power tool output torque, and the like. Torque sensors have been produced in many varieties, and can be generally classified in two categories: "compliant" and "non-compliant." In compliant torque sensors, a sensor is attached directly to an elastic beam section of a torque-producing shaft to measure the mechanical twist of the shaft. Often, in compliant sensors, the shaft twists up to about eight degrees over the full measurement range.

In one example of a compliant torque sensor, a strain gauge is used to measure perceivable twisting of the elastic beam section of the shaft. When torque is applied to the elastic beam section, the strain gauge is deflected, which causes a resistance change in the strain gauge. This change of resistance in the strain gauge indicates a change in torque. However, due to the rotating nature of the beam section to which the strain gauge is attached, connecting wires to the strain gauge for transmission of signals is impractical. Thus, torque sensors that use a strain gauge require a wireless transmitting device, such as a radio-frequency transmitter, to transmit resistance changes in the strain gauge to a receiver, which interprets these signals as torque values. Alternatively, a signal transference scheme utilizing slip rings, brushes and commutators could be used in a compliant torque sensing system. Other compliant torque sensors may include rotary encoders or potentiometers that are attached to the shaft to measure the mechanical twist of the shaft, and the mechanical twist is then converted to a torque value.

However, such compliant torque sensing systems present numerous problems. For instance, because the strain gauges are attached directly to an elastic beam, torque limiters must be included on the rotating shaft to protect the beam and strain gauges from being deflected beyond their elastic range. Unfortunately, such precautions inherently interfere with the transmission of energy through the shaft, and, in the instance of a steering wheel shaft, provide a "soft feel" to the user. Additionally, such torque sensors are of limited reliability due to the direct contact with the rotating shaft, and are very expensive. Torque sensors that use a strain gauge also require frequent calibration.

To overcome these problems, non-compliant torque sensors have been developed, whereby a sensor monitors shaft torque changes in a non-contacting manner, thus obviating the need for torque limiters. Normally, such torque sensors utilize a magnetoelastic element intimately attached to a rotating shaft, whereby the torque sensor operates on the principle of inverse-magnetostriction.

Magnetostriction is well known in the art and describes a structural property of matter that defines a material's dimensional changes as a result of a changing magnetic field. In essence, magnetostriction is caused when the atoms that constitute a material reorient to align their magnetic moments with an external magnetic field. This effect is quantified for a specific material by its saturation magnetostriction constant, which is a value that describes a material's maximum change per unit length.

In contrast, inverse-magnetostriction defines changes in a material's magnetic properties in response to applied mechanical forces. Torque sensors that utilize inverse-magnetostriction operate on the premise that stresses and strains that are transmitted through the rotating shaft to the magnetoelastic element by the application of torque cause measurable changes in the magnetic field of the magnetoelastic element. Thus, the magnetic field strength produced from the magnetoelastic element is a direct function of the magnitude of the torque applied. A torque sensor utilizing such a magnetoelastic element also has a magnetometer that translates the magnetic field strength emanating from the magnetoelastic element into an analog voltage signal, thereby performing a torque-to-voltage transducer function.

It is known in non-compliant torque sensors to attach a ring of magnetoelastic material to a rotating shaft using interference fitting, such as a pressure fit or shrink fit, using an inter-engaging mechanism such as mating splines or teeth, using a chemical such as an adhesive, using a thermal connection such as thermal spraying, or any other method of attaching that is known in the art. In practice, under any of the above attaching methods, the attachment of the magnetoelastic element to the shaft has proven to be of the utmost importance. Indeed, defects in the boundary between the magnetoelastic element and the torque carrying member will result in aberrant coupling of stress and strains into the magnetic element, which adversely affect torque measurements. Boundary defects can include imperfections such as voids, contaminates, and lateral shearing.

It is also known to endow the magnetoelastic element with the magnetic attributes required by imparting the element with circumferentially directed stress (also known as hoop stress). The present state of the art uses tensile stress to achieve hoop stress. Tensile stress in the magnetoelastic element acts to stretch the material, which can result in increased porosity. The increased porosity advances a phenomenon known as corrosion cracking, which is the propagation of microscopic fissures in the structure. As a result of corrosion cracking, the material can eventually lose its tensile stress component causing a degradation of its magnetic properties, possibly even causing a complete failure of the sensor.

Further, practical requirements for torque sensors include design tolerance limits on the accuracy and linearity of the in-range voltage output and the amount of hysteresis, also known as "zero shift," after a "yield torque" or "over-torque" is applied to the shaft. Such "over-torque" conditions can exist, for example, in steering systems during curb push-away situations, and can be experienced in transmission applications during drastic torque reversals. Hysteresis may occur because after the over-torque condition is relaxed, the resulting breakdown or slippage at the shaft/magnetoelastic element interface causes a mechanical bias in the magnetoelastic element. Consequently, a corresponding magnetic bias is produced, thereby negatively affecting future torque measurements.

There are a number of potential causes for the formation of the magnetic bias that affects future torque measurements and causes zero shift. For example, if the underlying shaft yields upon the application of a large torque, the shaft will not return to its quiescent state, and the measurement consequently will not return to zero. Alternatively, if a large torque causes the magnetoelastic element to yield, but does not cause the shaft to yield, then the magnetoelastic element will be stressed in the opposite direction when the torque is removed. Thus, the sensor will return to a position past zero, and the zero-shift in such a situation is negative. In sum, a zero shift in torque sensors can occur as a result of any of a combination of factors.

Further, if the breakdown of the shaft/magnetoelastic element interface is localized, the result may be a magnetic incongruity that manifests as a variance in torque measurements with respect to the angular position of the shaft. While such breakdown between the shaft and magnetoelastic element is normally not a problem where the magnetoelastic element is thermally sprayed, hysteresis still occurs in thermal sprayed magnetoelastic elements due to the different coefficients of thermal expansion between the shaft and magnetoelastic element, as will be explained in more detail herein.

For example, in an automotive steering column torque sensor, it is preferred that there be a full range torque measurement of +/−6 ft-lb, and a hysteresis requirement +/−1.5% of full scale after application of a 100 ft-lb yield torque. However, currently used thermal sprayed magnetic elements will exhibit hysteresis well over the acceptable limits even when a yield torque of only 15 ft-lb. is applied.

Thus, there is a need for a torque sensor that will exhibit low hysteresis after a yield torque is applied. Further, there is a need for a method of producing such a low hysteresis torque sensor.

Other needs will become apparent upon a further reading of the following detailed description taken in conjunction with the drawings.

SUMMARY OF THE INVENTION

In one form of the invention, the aforementioned needs are fulfilled by a low hysteresis torque sensor and method for producing a low-hysteresis magnetoelastic element comprising thermally spraying a magnetoelastic material onto a metal substrate. After the magnetoelastic element is securely bonded to the underlying shaft, a reduction in the outside diameter of the shaft draws the magnetoelastic element radially inward causing it to occupy a smaller volume. This process provides the magnetic anistropy required for the sensor to operate properly, and also results in a densification of the magnetoelastic element making it inherently stable. In a preferred embodiment, the magnetoelastic element comprises nickel and the substrate comprises stainless steel. It is further preferred that the substrate comprise a shaft and the magnetoelastic element comprise a circumferential ring intimately attached thereto.

Several methods of reducing the outside diameter of the shaft to draw the magnetoelastic element radially inward have been devised. For example, prior to deposition of the magnetoelastic material, the outside diameter of a hollow shaft is elastically expanded by applying force to its inside diameter. In preferred embodiments, this is accomplished by using an expanding insert, by pressurizing the cavity within the shaft, or by inducing a managed thermal expansion of the shaft prior to magnetoelastic material deposition. In an alternate embodiment, post-deposition operation can also be implemented to reduce the shaft diameter, such as drawing the shaft axially until it yields. Any process that results in a shaft reduction after the magnetoelastic active material is deposited on the shaft can be used in the present invention.

These and other features and advantages of the invention will be apparent upon consideration of the following detailed description of the preferred embodiments of the invention, taken in conjunction with the appended drawings.

DETAILED DESCRIPTION OF THE PREFERRED EMBODIMENTS

Figure 1:
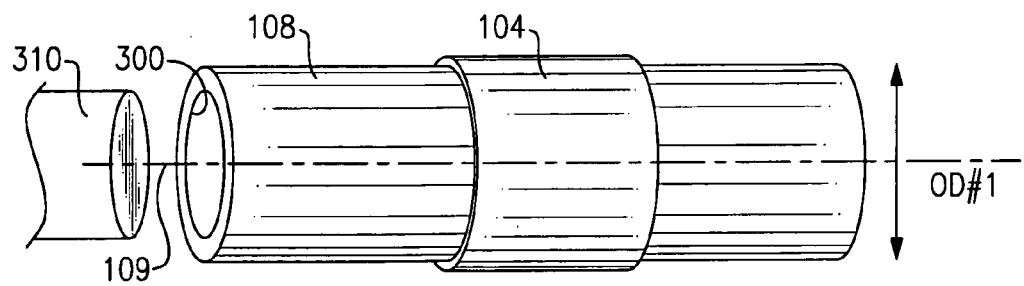
FIG. 1 is a perspective view of a torque producing shaft with a magnetoelastic element attached thereto.

While the present invention is capable of embodiment in various forms, there is shown in the drawings and will be hereinafter described presently preferred embodiments with the understanding that the present disclosure is to be considered as an exemplification of the invention, and is not intended to limit the invention to the specific embodiments illustrated.

Figure 2:
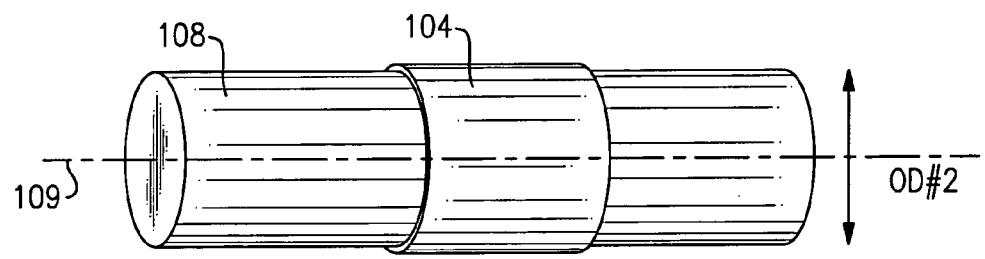
FIG. 2 is a perspective view of a torque producing shaft with a magnetoelastic element attached thereto.
Figure 3:
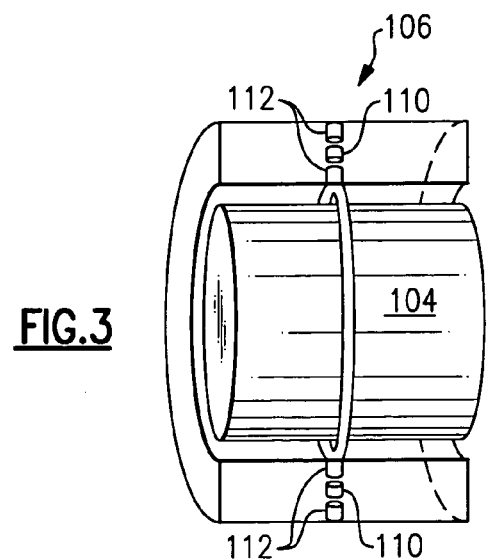
FIG. 3 is a partial perspective view of a magnetometer surrounding a magnetoelastic element.

With reference to FIGS. 1–3, a torque sensor according to a preferred embodiment of the present invention generally comprises a magnetoelastic element 104 and a magnetometer 106. Magnetoelastic element 104 is fixedly attached to a non-magnetic shaft 108, which is rotatable about a longitudinal axis 109. Non-magnetic shaft 108 preferably comprises stainless steel, and most preferably Nitronic 50 stainless steel. Further, it is preferable that magnetoelastic element 104 comprise a 99.9% pure nickel content powdered metal that is attached to shaft 108 via a thermal spraying process. It will be understood, however, that the shaft 108 may comprise any other non-magnetic material, such as aluminum. Further, the magnetoelastic element 104 may comprise any other material that has a negative coefficient of magnetostriction. It should be noted, however, that the polarity of the saturation magnetostriction constant for the magnetoelastic element 104 determines whether compressive stress or tensile stress is required to produce the correct magnetic anistropy within the material, as described further below. Thus, the material used for a ring in tensile stress would not be suitable for a ring in compressive stress.

As described above, it is crucial that an intimate bond be formed between the magnetoelastic element 104 and the shaft 108. Out of the methods of attaching described above, the thermal spraying process is preferred due its high bond strength and amenability to the high volume demands of the automotive marketplace. The thermal spray process utilized to deposit the magnetoelastic element 104 fuses the magnetoelastic element 104 to the underlying shaft 108 and creates a gradation at the substrate/coating interface boundary. The exact characteristics of the boundary are dependent on the type of and set-up of the spray gun used. The bond is typically mechanical in that it is created when the particles embed themselves into the substrate during impact. Welding, plating, and vapor deposition methods of attaching material to a shaft will each yield unique boundary characteristics. Any of these methods provide an intimate bond between the magnetoelastic element 104 and the underlying shaft 108 that is capable of surviving extreme torque levels that are well outside a full-scale measurement region. Indeed, it is known that thermal sprayed coatings have typical bond strengths on the order of 10,000 psi or greater.

As is known in the art, to effectively invoke the inverse magnetostrictive effect in a magnetoelastic element 104, the magnetoelastic element 104 must be pre-loaded with stress anisotropy in its quiescent state. In the case of a pressure-fit magnetoelastic element, this is accomplished through the pressure fit process, i.e., when the magnetoelastic element is fit over a shaft, compressive and tensile forces are formed therein. However, in contrast to the pressure fit magnetoelastic element, a reduction in the outside diameter of the shaft 108 after the magnetoelastic element 104 is deposited draws the magnetoelastic element 104 radially inward causing it to occupy a smaller volume. This process provides the magnetic anistropy required for the sensor to operate properly, and also results in a densification of the magnetoelastic element making it inherently stable.

It is the axial compressive stress component of the nickel magnetoelastic element that has been found to contribute to hysteresis. In particular, the thermal spraying process leaves an "axial magnet" in the magnetoelastic element, which lies dormant until enough torque is applied to charge the "axial magnet." Thus, as the principal stress vector (in the tangential direction) tips toward the axial direction with increasing torque loads, eventually a torque level is reached which causes a permanent axial magnetic charge, thus causing hysteresis (or "zero shift") in the magnetoelastic element. The net effect upon sensor output is that the sensor will indicate that some amount of torque is still being applied, even though it is not. Indeed, prior thermal sprayed torque sensors could withstand only 15 ft-lb. before severe hysteresis would occur.

In order to overcome this problem, the current invention contemplates reducing the outside diameter of the shaft 108 after the powdered nickel is thermally sprayed onto the shaft 108. This draws the magnetoelastic element 104 inward resulting in a densification of material and increases the circumferentially oriented compressive stresses. This process has the effect of substantially reducing or eliminating the axial compressive stress created by the different thermal expansion coefficients between the sprayed magnetoelastic element 104 and the shaft 108, and thus substantially prevents hysteresis upon application of a yield torque because there will no longer be any substantial dormant "axial magnet" in the magnetoelastic element.

Several methods of reducing the outside diameter of the shaft 108 to draw the magnetoelastic element 104 radially inward have been devised. In a first embodiment, prior to deposition of the magnetoelastic material, the outside diameter of a hollow shaft 108 is elastically expanded by applying force to its inside diameter by inserting an expanding insert into the shaft 108. This is shown schematically in FIG. 1, wherein a cavity 300 in the shaft will receive the expanding insert 310, shown schematically. The expanding insert may be as known. This expanding insert is expanded to increase the diameter of the shaft 108, as shown in FIG. 1, before the magnetoelastic element 104 is deposited on the shaft 108. Then, after the deposition of the magnetoelastic element 104, the expanding insert is contracted and removed from the shaft 108, and the diameter of the shaft returns to its initial value, as shown in FIG. 2. Thus, OD#1 in FIG. 1 is greater than OD#2 in FIG. 2. Thus, after the expanding insert is removed, the outside diameter of the shaft 108 is reduced and the magnetoelastic element 104 is drawn radially inward causing it to occupy a smaller volume. This process provides the magnetic anisotropy required for the sensor to operate properly, and also results in a densification of the magnetoelastic element 104, making it inherently stable.

In a second embodiment, prior to deposition of the magnetoelastic material, the outside diameter of a hollow shaft 108 is elastically expanded by applying force to its inside diameter by pressurizing the cavity within the shaft 108. This pressurization increases the diameter of the shaft 108, as shown in FIG. 1, before the magnetoelastic element 104 is deposited on the shaft 108. Then, after the deposition of the magnetoelastic element 104, the pressure is released from the cavity within the shaft 108, and the diameter of the shaft 108 returns to its initial value, as shown in FIG. 2. Thus, OD#1 in FIG. 1 is greater than OD#2 in FIG. 2. Thus, after the pressure is removed, the outside diameter of the shaft 108 is reduced and the magnetoelastic element 104 is drawn radially inward causing it to occupy a smaller volume. This process provides the magnetic anisotropy required for the sensor to operate properly, and also results in a densification of the magnetoelastic element 104, making it inherently stable.

In a third embodiment, prior to deposition of the magnetoelastic material, the outside diameter of a shaft 108 is elastically expanded by inducing a managed thermal expansion of the shaft 108. This thermal expansion increases the diameter of the shaft 108, as shown in FIG. 1, before the magnetoelastic element 104 is deposited on the shaft 108. The axial thermal growth is constrained during the thermal expansion to prevent any residual axial compressive stress in the magnetoelastic element 104. After the deposition of the magnetoelastic element 104, the shaft 108 is allowed to cool, removing the thermal expansion, and the diameter of the shaft 108 returns to its initial value, as shown in FIG. 2. Thus, OD#1 in FIG. 1 is greater than OD#2 in FIG. 2. Thus, after the thermal expansion is removed, the outside diameter of the shaft 108 is reduced and the magnetoelastic element 104 is drawn radially inward causing it to occupy a smaller volume. This process provides the magnetic anisotropy required for the sensor to operate properly, and also results in a densification of the magnetoelastic element 104, making it inherently stable.

In a fourth embodiment, the outside diameter of the shaft 108 is not increased prior to deposition of the magnetoelastic material 104. Thus FIG. 1, shows the shaft 108 in an unexpanded state just after the magnetoelastic element 104 is deposited on the shaft 108. Then, after the deposition of the magnetoelastic element 104, the shaft 108 is drawn axially until it yields, permanently reducing the outside diameter of the shaft 108, as shown in FIG. 2. Thus, OD#1 in FIG. 1 is greater than OD#2 in FIG. 2. After the shaft 108 is drawn axially until it yields, the outside diameter of the shaft 108 is permanently reduced and the magnetoelastic element 104 is drawn radially inward causing it to occupy a smaller volume. This process provides the magnetic anisotropy required for the sensor to operate properly, and also results in a densification of the magnetoelastic element 104 making it inherently stable.

Advantageously, the major compressive stress, which is used for sensor readings, remains in a tangential direction after application of the above processes. Thus, through any of the above processes, a magnetoelastic element 104 is produced that will exhibit levels of hysteresis well within preferred limits upon an application of a yield torque, which results in consistently accurate torque measurements. It will be understood that although thermal spraying is discussed herein, the present invention is capable of being applied to a variety of methods of attaching the magnetoelastic element 104 to the shaft 108, including, but not limited to, welding, plating, physical vapor deposition and chemical vapor deposition.

Preferably, after the magnetoelastic ring 104 is attached to the shaft 108, it is charged on a magnetizing fixture (not shown), which creates counter-opposing magnetic fields. Thus, one-half of the ring is circumferentially charged in a clockwise direction, while the other half is circumferentially charged in a counter clockwise direction. This charging technique is used to provide immunity from stray magnetic fields that would normally interfere with the sensing capacity of the magnetometer 106. However, it should be noted that the current invention is applicable to a unidirectionally magnetized ring, or any number of contiguous oppositely magnetized sections of a magnetoelastic ring.

An example of the aforementioned process will now be detailed for thermally spraying a magnetoelastic element comprising 270/D size nickel powder onto a stainless steel shaft. It should be noted that the following specific example is provided to illustrate further aspects and unique advantages of the present invention, and other features and embodiments should become apparent to those skilled in the art. A one-inch long band of 0.02 inch-thick nickel powder is sprayed on a one-inch diameter Nitronic 50 shaft using an HVOF thermal spray gun. Before applying the nickel, the shaft is pre-heated to 650 degrees Celsius while the axial thermal growth is constrained. After the nickel powder is sprayed onto the shaft, the shaft is cooled. This example is set forth for illustration only, and should not be construed as a limitation on the scope of the present invention.

After the magnetoelastic ring 104 is attached to the shaft 108 and magnetically charged by the foregoing method, an annular magnetometer is assembled around the magnetoelastic ring 104 in a non-contacting manner, as shown in FIG. 3 with half of the magnetometer 106 casing removed. The magnetometer 106 has the purpose of translating the magnetic signal emitted by the magnetoelastic element 104 into an electrical signal that can be read by system-level devices. As described above, due to the inverse-magnetostrictive effect of the magnetoelastic material, the polarity and magnitude of the radially directed magnetic flux found at the circumferential centerline of the magnetoelastic element are related directly to torque. Preferably, the magnetometer 106 is rigidly attached to a static element (not shown) proximate the shaft 108, such as an automobile chassis frame in the case of the torque sensor being used to detect torque on a drive shaft, steering column, or the like.

The magnetometer 106 used in the present invention is preferably constructed of a ferromagnetic material such as mild steel, and preferably utilizes flux gate magnetometry, also known as saturable-core magnetometry, which is well known to those skilled in the art. This preferred magnetometer design is substantially described in U.S. Pat. No. 5,889,215, which is hereby incorporated by reference.

Essentially, flux gate magnetometers operate on the premise that in the absence of an external magnetic field, a reference signal can be established by periodically bringing a piece of high permeability magnetic material in and out of magnetic saturation by an AC inductance pulse. Any time shift in the reference signal caused by an outside source, such as the magnetoelastic element 104, can be measured and translated into an absolute magnetic field strength of the outside source.

Although many flux gate designs have used separate drive and pickup coils, it is preferable for purposes of the present invention that the magnetometer 106 (FIG. 3) contain only one coil for both functions, as is known in the art. Further, it is preferable that the magnetometer 106 contain at least two drive/pickup coils 110, hereinafter referred to as flux gates 110.

To improve performance of the magnetometer, flux guides 112 are provided in the magnetometer 106, and are attached to the flux gates 110. The flux guides 112 amplify and focus the magnetic signal radiating from the magnetoelastic element 104 prior to detection by the flux gates 110, thereby improving the signal to noise ratio. Further, the flux guides 112 provide additional signal conditioning by substantially removing irregularities in the magnetic signal from the magnetoelastic element 104. This is accomplished due to the flux guide 112 collecting magnetic flux over a large angular distance.

To further improve the magnetometer's resistance to stray signals present in the environment, also known as common mode noise, common-mode rejection schemes are employed in the design of the electronic and magnetic circuits in the magnetometer, as well as the structure of the magnetometer itself. For example, wherever possible, differential circuitry, as is known in the art, is used in the electronic design in order to negate common-mode noise. This effect is duplicated in the magnetometer design through the use of symmetrically shaped flux guides 112 and symmetrically placed flux gates 110, which are preferably separated by 180 degrees.

Finally, to augment the electrical and magnetic common-mode rejection strategies, EMI and magnetic shielding structures are incorporated into the magnetometer design, as are well known in the art. Thus, by utilizing the aforementioned common mode rejection schemes and shielding, stray magnetic and electromagnetic signals found in the environment are substantially prevented from interfering with the flux gates 110 and the magnetoelastic element 104.

As those skilled in the art will readily understand, the non-compliant torque sensor of the present invention can be used on a variety of applications, including, but not limited to, steering wheel effort measurements in electronic power steering systems, determination of transmission output torque for electronically controlled shifting, cam and crankshaft torque measurements for engine misfire detection, anti-lock brake system wheel torque measurements, vehicle suspension measurements for active ride compensation, and brake pedal torque measurements for electric breaking.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is to be understood that it is the following claims, including all equivalents, that are intended to define the spirit and scope of the invention.

What is claimed is:

1. A method for forming a magnetoelastic element for use in a torque sensor comprising:
   increasing an outer diameter of an elongated, circular substrate;
   then applying a magnetoelastic material onto the substrate; and
   then reducing the outer diameter of the substrate; and
   wherein the outside diameter of the substrate is increased by inserting an expandable insert into a cavity in the substrate and expanding the insert until the outer diameter is temporarily increased; and
   wherein the outside diameter of the substrate is reduced by contracting the expandable insert and removing the expandable insert from the substrate after the magnetoelastic material has been applied to the substrate.

2. The method according to claim 1, wherein the substrate is a shaft.

3. The method according to claim 2, wherein the outside diameter of the shaft is increased by pressurizing an internal cavity of the shaft until the outer diameter is temporarily increased.

4. The method according to claim 3, wherein the outside diameter of the shaft is reduced by removing the pressure from the internal cavity.

5. The method according to claim 2, wherein the outside diameter of the shaft is increased using a managed thermal expansion of the shaft until the outer diameter is temporarily increased.

6. The method according to claim 5, wherein the outside diameter of the shaft is reduced by cooling the shaft to remove the thermal expansion of the shaft.

7. The method according to claim 1, wherein said magnetoelastic material is applied as a spray.

8. A method for forming a magnetoelastic element for use in a torque sensor comprising:
   applying a magnetoelastic material onto a substrate having an outer diameter, said material as applied having a first outer diameter; and
   then reducing the outer diameter of the substrate; and
   wherein the outer diameter of said substrate after the reducing step is less than the first outer diameter of said substrate prior to said the applying step after the magnetoelastic material has been applied to the substrate.

9. The method according to claim 8, wherein the substrate is a shaft.

10. The method according to claim 9, wherein the outside diameter of the shaft is reduced by drawing the shaft axially until the shaft yields.

11. The method according to claim 8, wherein said magnetoelastic material is applied as a spray onto said substrate.

12. The method according to claim 8, wherein prior to said applying step, said substrate outer diameter is increased.

13. The method according to claim 8, wherein said reducing step includes taking an active action on said substrate to cause said reduction.

14. A method for forming a magnetoelastic element for use in a torque sensor comprising:
   increasing an outer diameter of an elongated, circular substrate;
   then applying a magnetoelastic material onto the substrate; and
   then reducing the outer diameter of the substrate after the magnetoelastic material has been applied to the substrate; and
   wherein said elongated circular substrate has a cavity, and a material is inserted into said cavity to cause said increasing outer diameter.

15. The method according to claim 14, wherein said material is an expandable insert.

16. The method according to claim 14, wherein said material is a fluid.

* * * * *